UNITED STATES PATENT OFFICE.

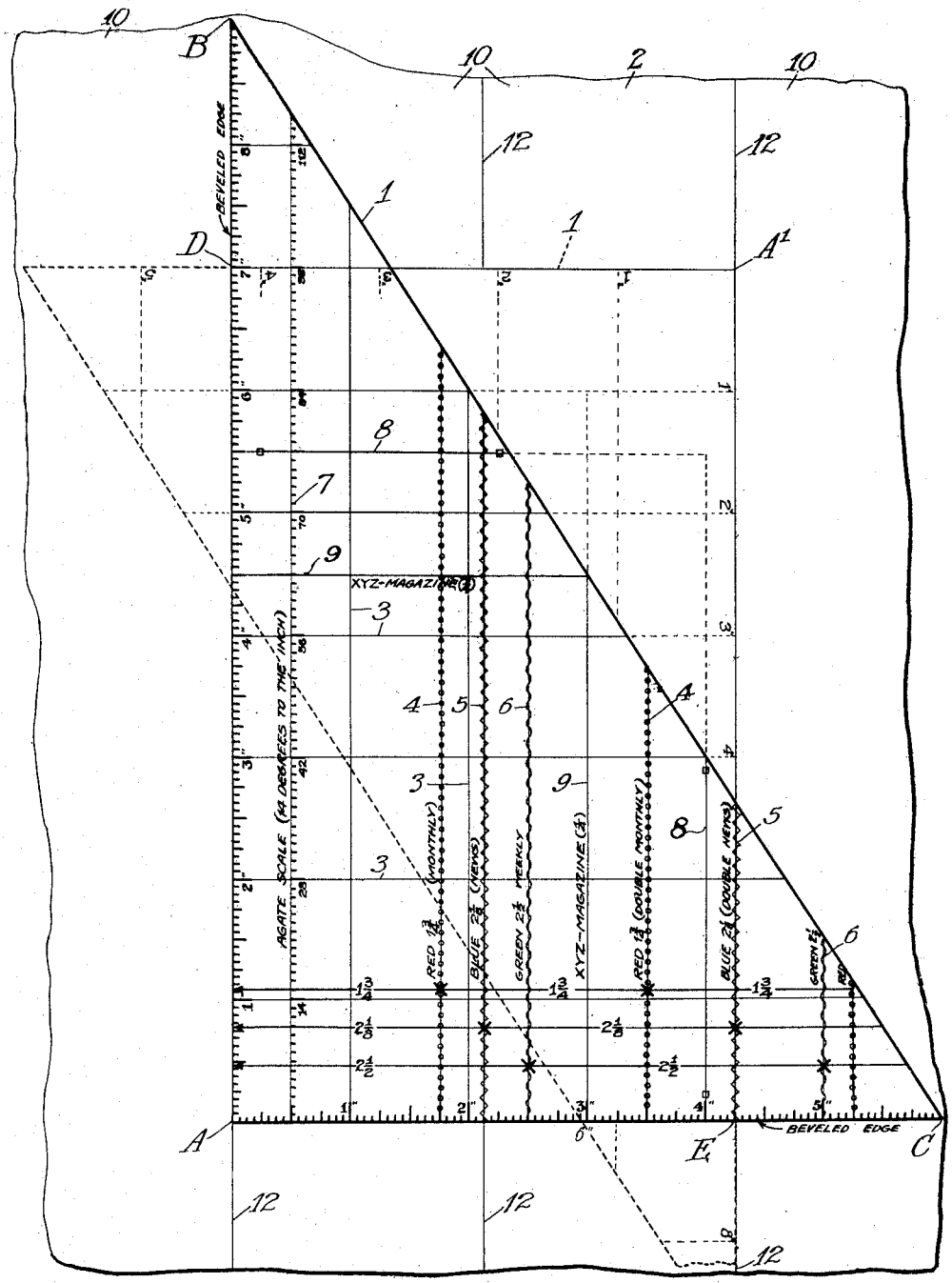

CARROLL DEAN MURPHY, OF CHICAGO, ILLINOIS.

ADVERTISING LAY-OUT SCALE.

1,369,833. Specification of Letters Patent. Patented Mar. 1, 1921.

Application filed June 22, 1918. Serial No. 241,360.

*To all whom it may concern:*

Be it known that I, CARROLL DEAN MURPHY, a citizen of the United States of America, and a resident of Chicago, county of Cook, and State of Illinois, have invented certain new and useful Improvements in Advertising Lay-Out Scales, of which the following is a specification.

This invention relates to methods and means for estimating and laying out space for printed matter such as advertising and the like, and more particularly to scales or gages adapted to facilitate such work, as for instance in connection with soliciting the patronage of advertisers seeking wide publicity through numerous publications.

The main objects of the invention are to provide a gage or scale of improved form adapted to assist the solicitor in estimating and laying out the space to be used in various magazines and other publications, and on different sizes of pages and widths of columns, and for various sizes of type and pictorial units; to provide such a gage equipped with scale markings or indicia adapted to facilitate rapid making and checking measurements and columnar layouts; and to provide a gage of the character stated carrying such scales and legends as may be most useful to advertising agents, editors, artists, engravers, lay-out men, and others having to do with the art.

In the accompanying drawing of an illustrative embodiment of this invention there is shown a plan of a preferred form of scale in full lines, and also the same scale in dotted lines in a different position, as applied in laying out space on a page.

In the embodiment shown in the accompanying drawing, the gage 1 lying on the page or sheet 2 consists of a thin plate or sheet of substantially rigid material, which may to advantage be somewhat yielding and resilient. It has the shape of a right angled scalene triangle, and is preferably transparent or translucent.

The sides A—B and A—C of the gage are beveled on the upper side or face and provided with linear scales expressed in inches and fractions thereof down to sixteenths, as customary for such scales. The side A—C or base is six inches long, and the side A—B or height measures nine inches, this particular relation being chosen arbitrarily because of its general convenience and utility, although in some instances other ratios and other sizes may be preferable or necessary, much larger sizes being required for certain magazines and newspapers. The third side or hypotenuse B—C may be plain.

A grid effect is produced by extending the index marks 3 at the end of every inch entirely across the plate, thus dividing the face of the gage into rectangles one inch square, adapted to facilitate estimating areas based on square inches, as for instance the size of engravings. This checkerboard effect is useful in laying out drawings, estimating reductions, making allowance for margins, et cetera.

In order to facilitate laying out work in accordance with standard column widths, the several widths most frequently used are indicated by additional vertical lines parallel with the side A—B, as for instance, by the lines 4, 5, and 6 representing columns having widths of $1\frac{3}{4}$ inches, $2\frac{1}{8}$ inches, and $2\frac{1}{8}$ inches respectively, these width dimensions being indicated by numerals on the gage as shown, so as to preclude errors. The several column lines 4, 5, and 6 are also distinguished by peculiar inherent characteristics, for instance distinctive colors as red, blue, and green respectively. Thus it will be seen for instance that a two-column space on a page having $2\frac{1}{8}$ inch width columns is indicated by the second blue line measuring from the corner A, and is $4\frac{1}{4}$ inches wide.

The lines 4, 5, and 6 may to advantage be further distinguished by suitable markings, as for instance a series of small circles or dots on the lines 4, an angular line superimposed on the lines 5, and a wavy line placed symmetrically on the lines 6, as will be understood by reference to the drawing.

In order to facilitate estimating columnar heights in terms of lines of type, scales may be provided representing the different sizes of type, as for instance the "agate" scale which is based on fourteen lines to the inch, as indicated on the line 7 parallel with the side A—B. Referring to said scale on line 7, numbered from 1 upward, it will be seen that column seven inches in height would contain ninety-eight lines of agate type.

The method of using the gage may be illustrated as follows: Supposing it is desired to lay out the space for a seven-inch two-column advertisement in a paper having 2⅛" columns. The gage is applied first in its upright position as indicated by full lines on the drawing, preferably to a blank sheet of paper. Lines are then drawn on said sheet from the corner A along the sides A—B and A—C respectively, the line representing the height of the column being extended seven inches to the point D on the paper and the line representing the width of the space being extended over the width of two of the 2⅛" (blue) columns to the point E which measures 4¼ inches. The gage is then turned or rotated in the same plane through an angle of 180°, so as to exactly reverse the positions of the points on the gage corresponding with the letters D and E on the paper as shown on the drawing. Then lines are drawn from said points convergently along the sides of the gage and terminating at A'. The lines thus drawn form an oblong rectangle seven inches high and 4¼ inches wide representing the space to be used.

Additional lines may also be provided on the face of the gage to represent some of the preferred standard page sizes or parts of a page, as for instance half-page, quarter-page or other fractions, as may be required. For instance the lines 8, one 5½ inches from the base and the other four inches from the side A—B, may represent the size of a quarter-page in a certain magazine, and the lines 9 designating a space three inches wide and 4½ inches high, may represent a quarter-page in a certain other magazine. The said lines 8 and 9 may to advantage be distinguished by suitable arbitrary signs, as for instance tiny rectangles on the lines 8, or the name of the magazine may be used, as for instance the "XYZ magazine" on lines 9.

If it is desired to ascertain quickly whether a certain cut or make-up, such as are commonly used and distributed among selected publishers, will fit a certain space in a given publication, it is only necessary to apply the gage to such cut or make-up and the corresponding lines, such as 8 or 9, will show at a glance whether or not the matter can be used as submitted, and to what extent changes may be necessary. For instance the fact might thus be quickly determined that a make-up 5¼ inches high and 3¾ inches wide can be used in the publication space indicated by the lines 8 but not in the space indicated by the lines 9.

Referring to the drawing the sheet 2 may represent part of a newspaper with the columns 10 indicated by the lines 12.

Although for various reasons including small size, lightness, convenience in operation, and economy of material, a triangular form is preferred, it is to be understood that so long as a right angle is provided, as B—A—C, the gage may be varied in form, so far as the side B—C is concerned.

It is to be understood that the page scaling rectangles 8—8, 9—9, and the like need not be fully shown, and that they are sufficiently indicated for the purpose of this invention if parts of the four sides are shown, it being understood that the interrupted lines such as 8—8 are to be regarded as extending until they meet, as will be apparent, and as suggested by the dotted lines on the drawing. The scaling of space by the rectangle indicated by lines 8—8 may be effected just as readily as by the rectangle of lines 9—9.

The various scale marks and other indicia including the grid lines, numerals, letters, et cetera, are preferably indented and may be formed by molding, stamping, or scoring, and filling with a suitable dark paste, enamel or the like, containing such pigments as may be necessary to effect the color distinctions herein described and to make the markings clear.

The usual sizes required for gages are such as will answer for page dimensions of 5½ x 8 inches, 7¼ x 10⅜, 9⅜ x 12¼ or 13¼ or 14, though these sizes may vary from time to time. For particular instances the gage may be made in special sizes corresponding to the page size of the particular advertising medium. Such a scale indicates the size of the cover page, the inside page, half and quarter pages, columns, et cetera.

This gage is adapted to serve as a standard article of equipment in the advertising departments of business concerns, in advertising agencies, in printing offices, and in publishing houses, and is especially useful in the hands of editorial make-up editors, house organ editors, artists, engravers, architects, and draftsmen.

Economy of the worker's time is effected by the habitual use of this gage in many situations, as for instance in laying out the size of the type space neatly in the center of the page preparatory to making a "lay-out" or drawing; in designing book pages and margins; in designing commercial literature; in checking advertising insertions for correct space; in making up booklets and commercial literature; in arriving at proportions for enlargements or reductions; in assisting engravers and others interested in reductions, trimming of pictures and scaling of cuts; and in all drafting work where unscaled triangles are now used.

Although but one specific embodiment of this invention has been herein shown and described, it will be understood that numerous details of the construction shown may be altered or omitted without departing from the spirit of this invention as defined by the following claims.

I claim:

1. A gage of the character described having two edges disposed to form a right angle, and scales being provided at and along or adjacent to each of said edges adapted for gaging the space in terms of column widths and lines of height respectively.

2. A gage of the character described having two edges disposed to form a right angle, and pairs of lines disposed perpendicular to each other and to said edges to indicate in conjunction therewith a plurality of rectangles corresponding with certain standard page spaces respectively, the related pairs of lines having distinguishing characteristics.

3. A gage of the character described having two edges disposed to form a right angle, and scales being provided at and along or adjacent to each of said edges, said scales including general standard linear scales (e. g. inches) for each edge respectively and special printer's scales of appropriate character, one for each of said edges.

Signed at Chicago this 19th day of June, 1918.

CARROLL DEAN MURPHY.